(No Model.) 12 Sheets—Sheet 1.
A. EUSTON.
CARTRIDGE LOADER.
No. 405,152. Patented June 11, 1889.
Fig. I.
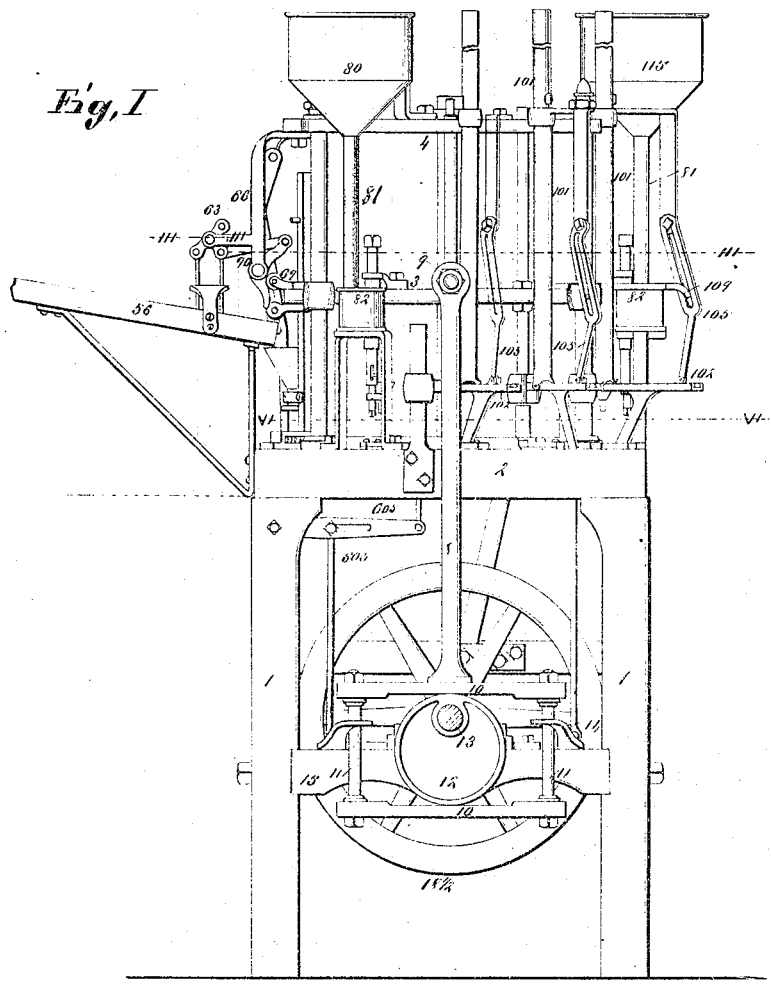
Fig. II.
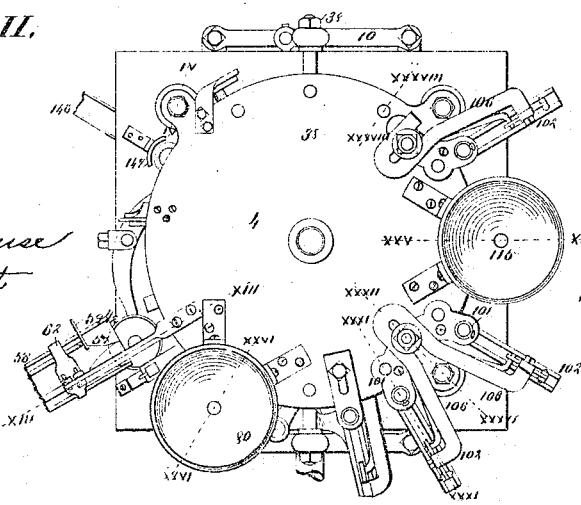
Attest:
Geo. E. Cruse
S. H. Knight
Inventor:
Alex Euston
By Knight Bros
Attys (No Model.)  12 Sheets—Sheet 2.
A. EUSTON.
CARTRIDGE LOADER.
No. 405,152. Patented June 11, 1889.
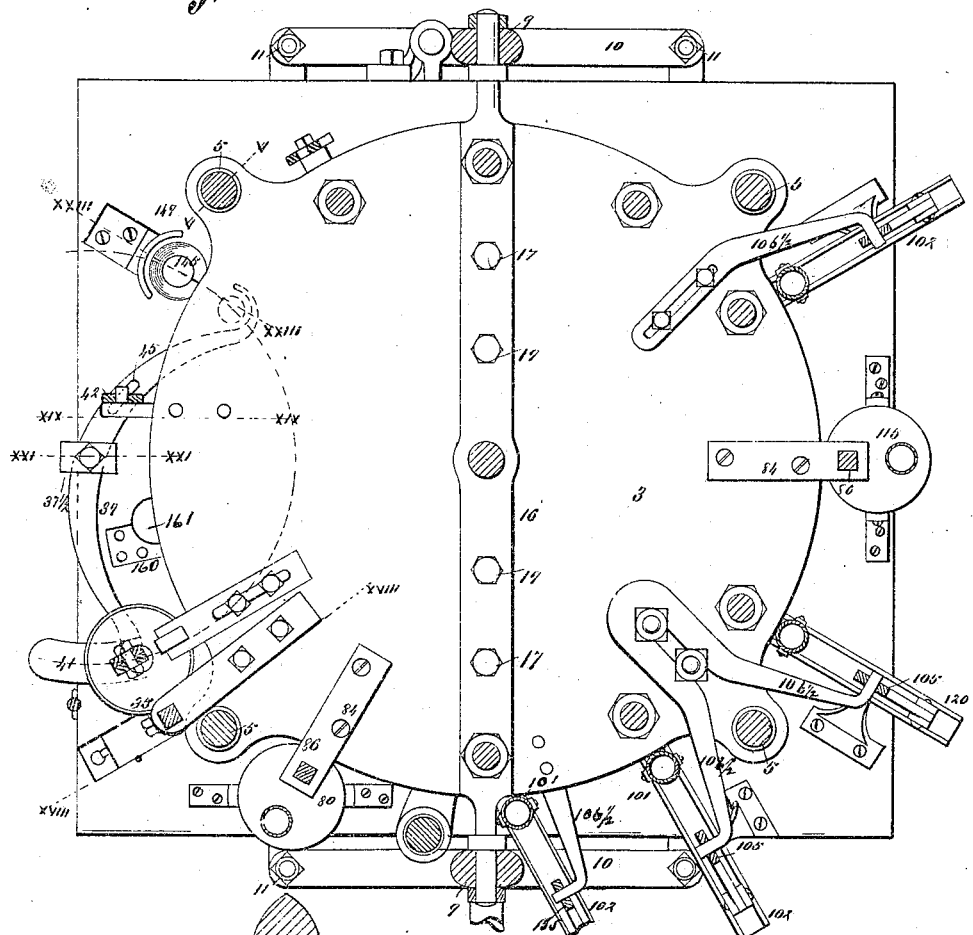
Fig. III
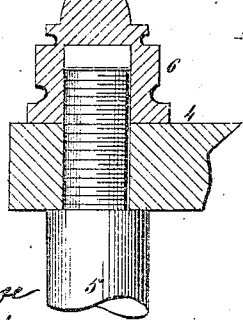
Fig. IV.
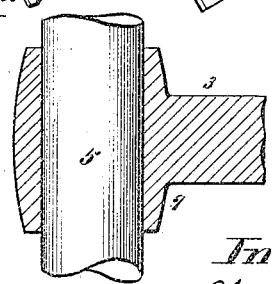
Fig. V.
Attest:
Geo. E. Cruse
S. H. Knight
Inventor:
Alex Euston
By Knight Bro
Attys (No Model.) 12 Sheets—Sheet 3.
A. EUSTON.
CARTRIDGE LOADER.
No. 405,152. Patented June 11, 1889.
Fig. VI
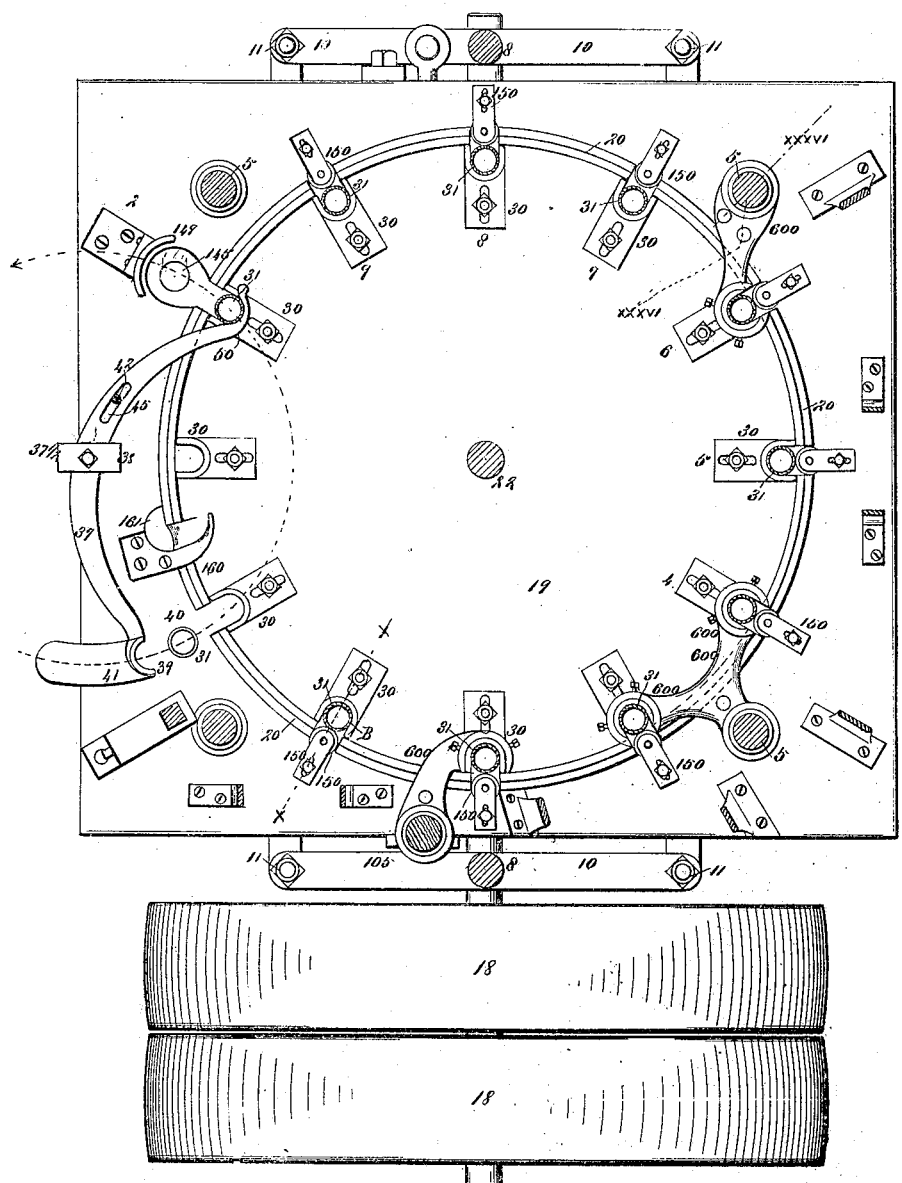
Attest:
Geo. E. Cruse
S. H. Knight
Inventor:
Alex. Euston
By Knight Bros
attys (No Model.) 12 Sheets—Sheet 4.
A. EUSTON.
CARTRIDGE LOADER.
No. 405,152. Patented June 11, 1889.
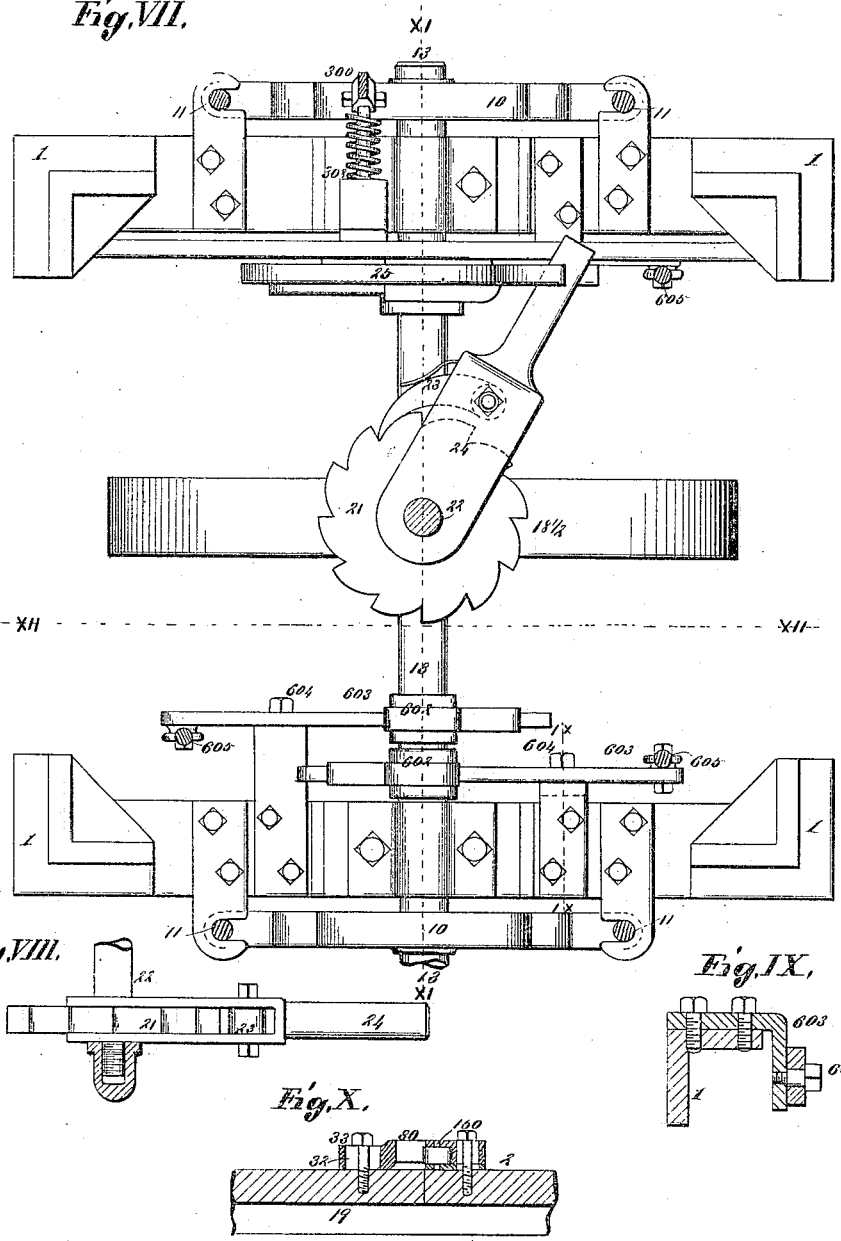

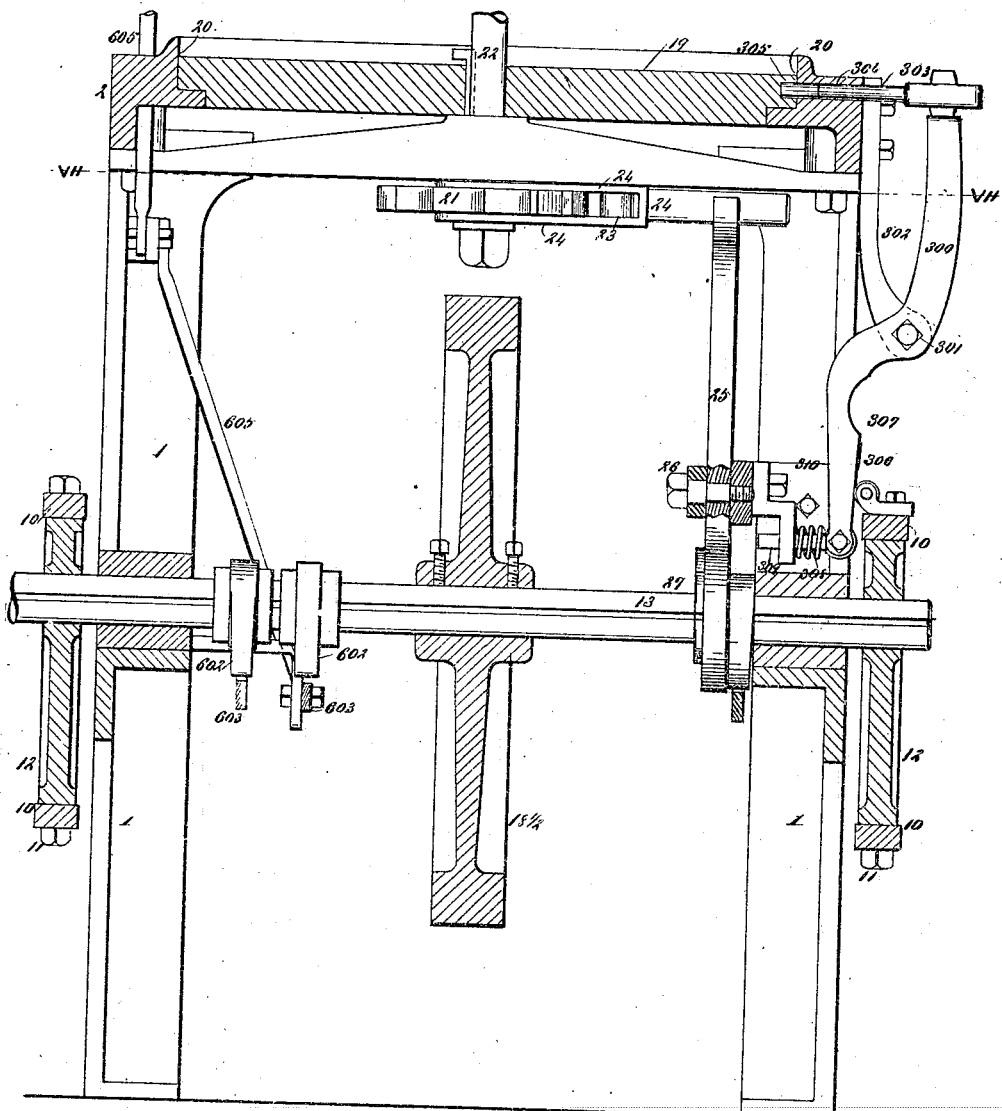

(No Model.)  A. EUSTON.  12 Sheets—Sheet 6.
CARTRIDGE LOADER.
No. 405,152.  Patented June 11, 1889.
Fig. XII.
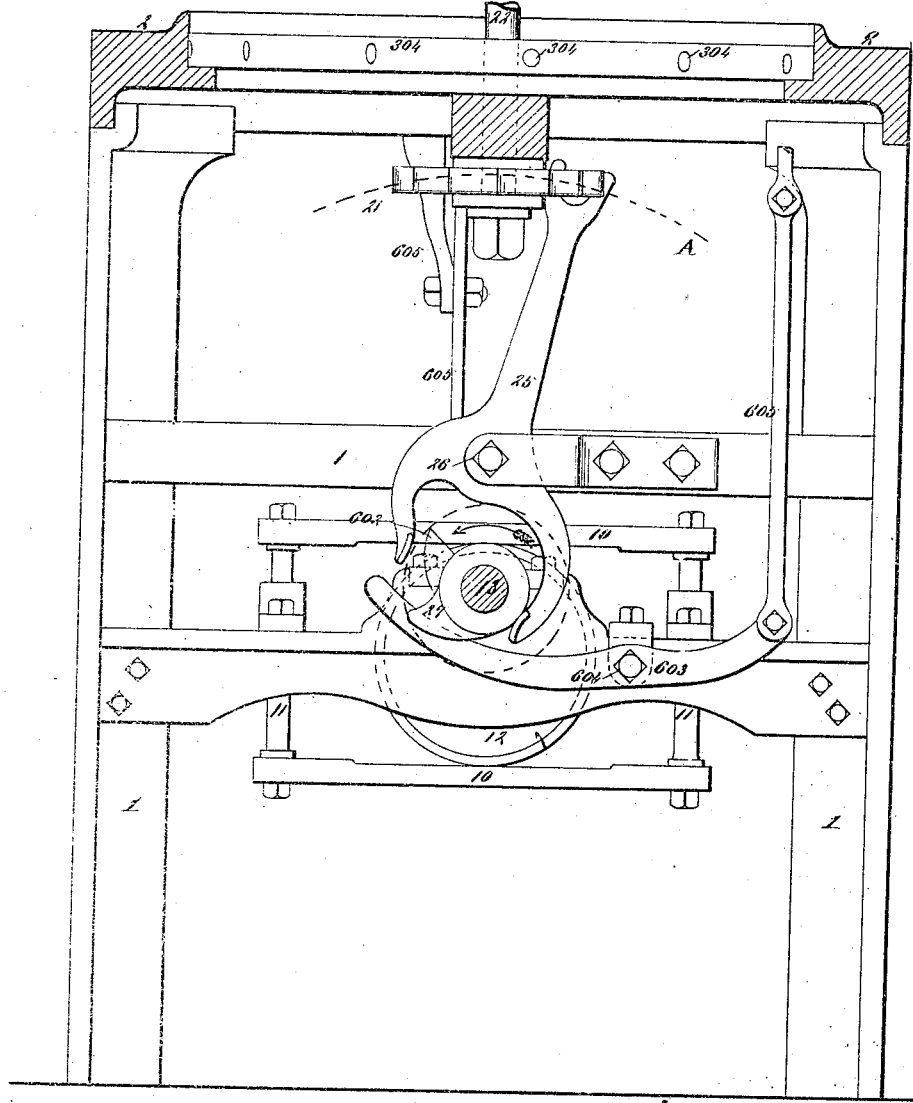

(No Model.)
A. EUSTON.
CARTRIDGE LOADER.
No. 405,152. Patented June 11, 1889.
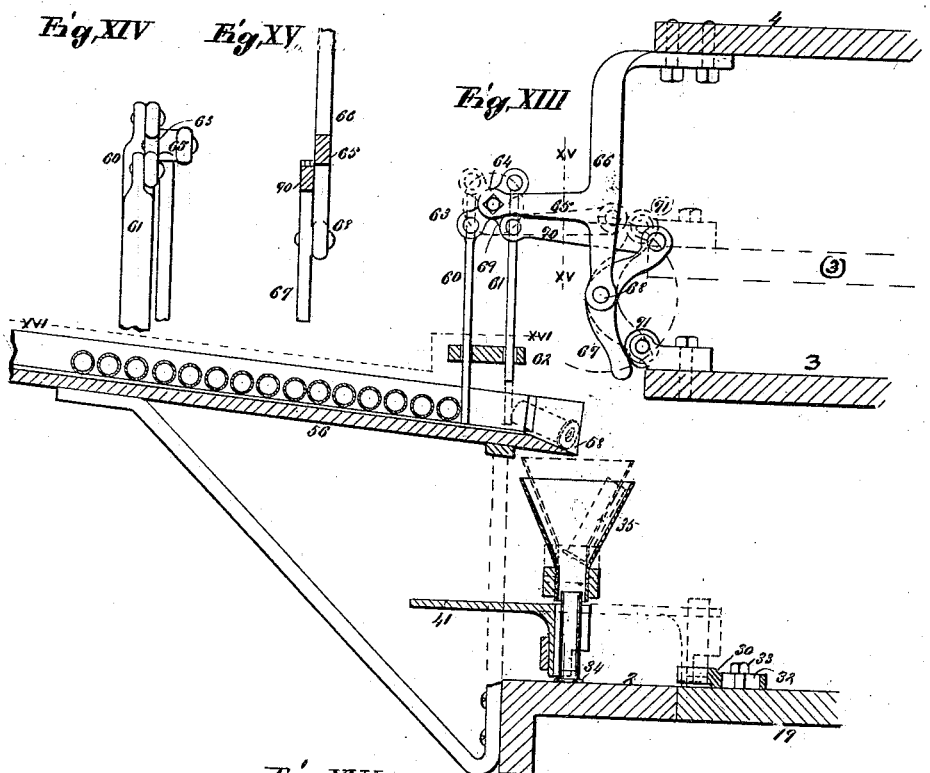
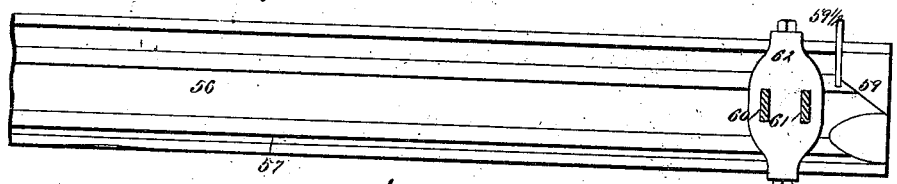
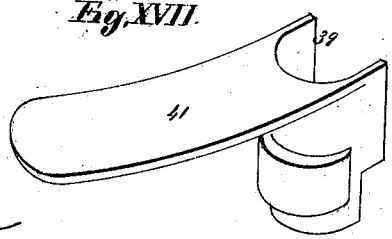
Attest:
Geo. E. Cruse
S. H. Knight
Inventor:
Alex Euston
By Knight & Bro
Attys (No Model.)
A. EUSTON.
CARTRIDGE LOADER.
No. 405,152. Patented June 11, 1889.
12 Sheets—Sheet 8.
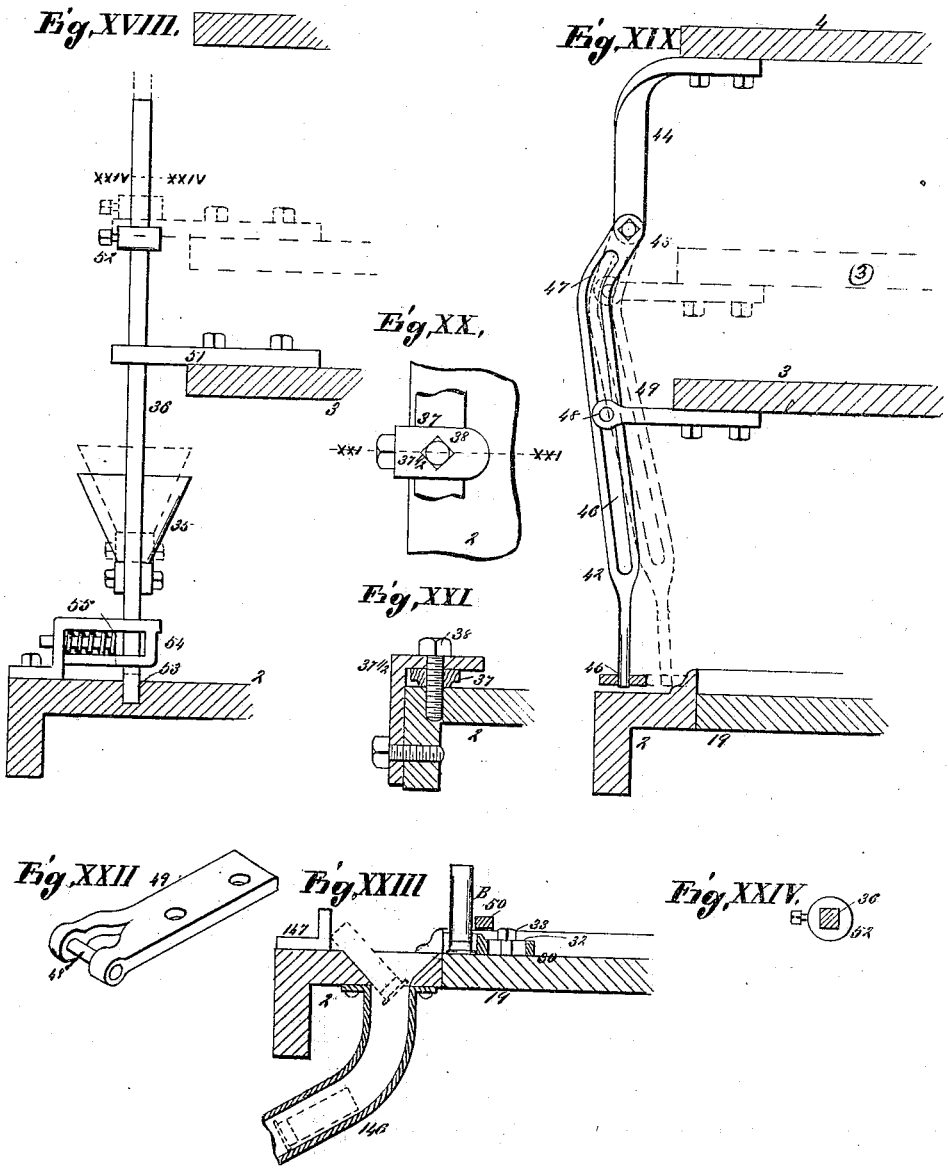

(No Model.) 12 Sheets—Sheet 9.
A. EUSTON.
CARTRIDGE LOADER.
No. 405,152. Patented June 11, 1889.
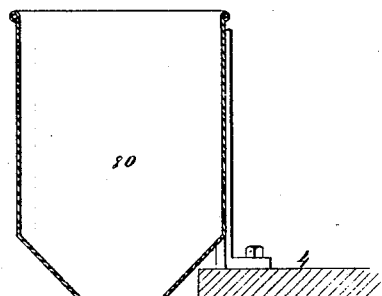
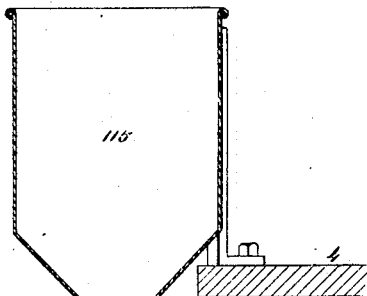
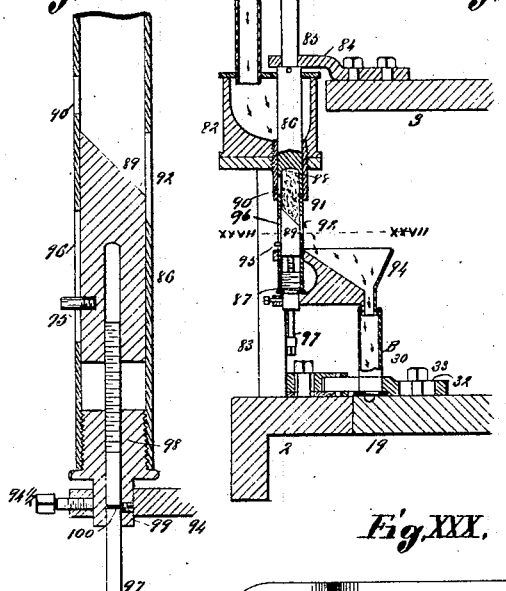
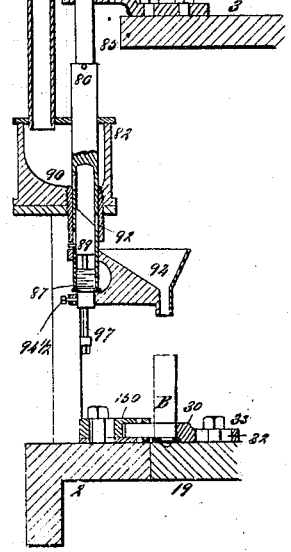
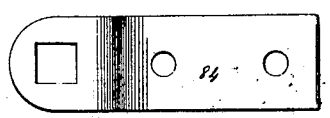
Inventor:
Alex Euston
By Knight Bros
Attys
Attest:
Geo. E. Cryse
S H Knight (No Model.) 12 Sheets—Sheet 10.
A. EUSTON.
CARTRIDGE LOADER.
No. 405,152. Patented June 11, 1889.
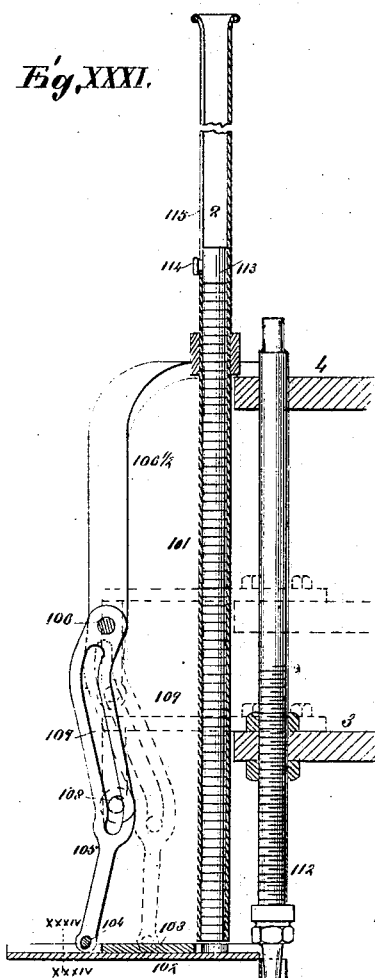
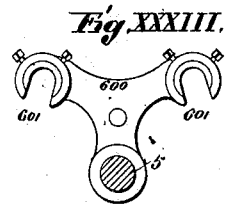
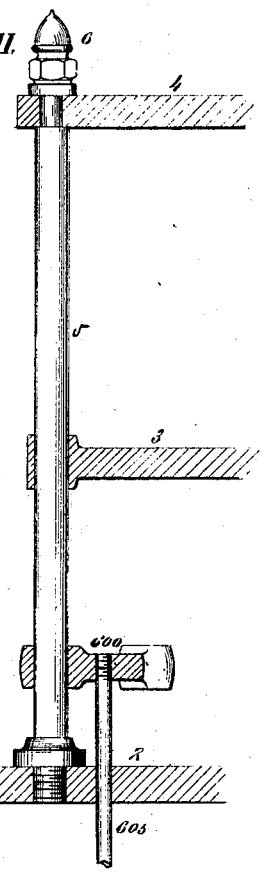
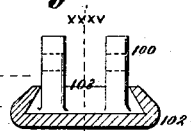
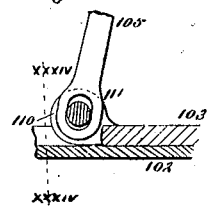
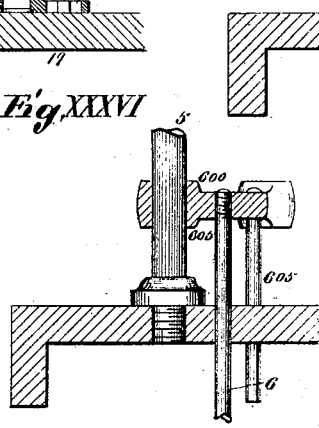
Attest:
Geo. C. Knight
S. H. Knight
Inventor:
Alex. Euston
By Knight Bro.
Atty (No Model.) 12 Sheets—Sheet 11.
A. EUSTON.
CARTRIDGE LOADER.
No. 405,152. Patented June 11, 1889.
Fig. XXXVII.    Fig. XXXIX.    Fig. XXXVIII.    Fig. XL.
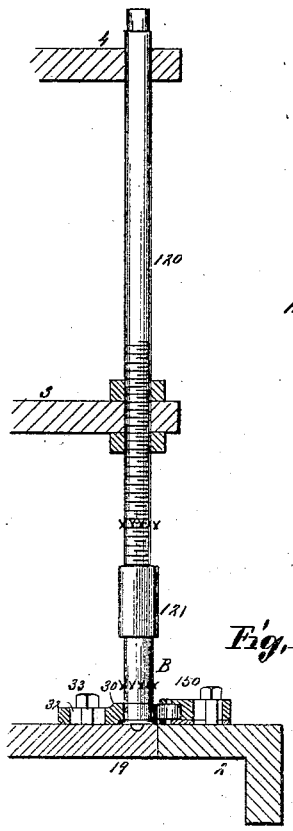 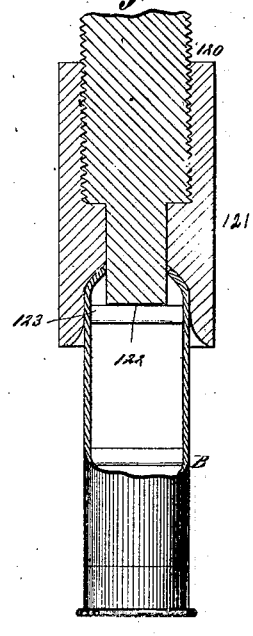 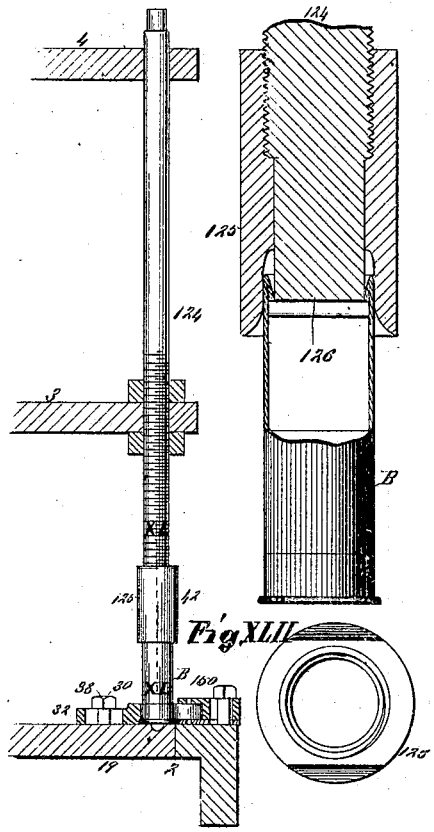
Fig. XLI.        Fig. XLII.
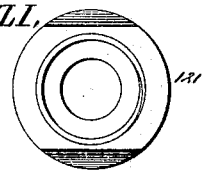 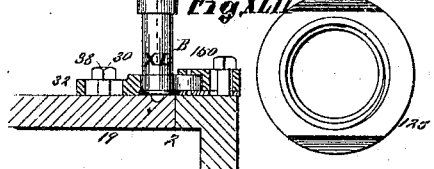
Fig. XLIII.    Fig. XLIV.
 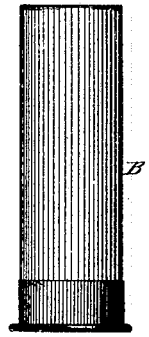
Attest:
Jno. C. Cuper
S. H. Knight
Inventor:
Alex. Euston
By Knight Bros
Attys (No Model.) 12 Sheets—Sheet 12.
A. EUSTON.
CARTRIDGE LOADER.
No. 405,152. Patented June 11, 1889.
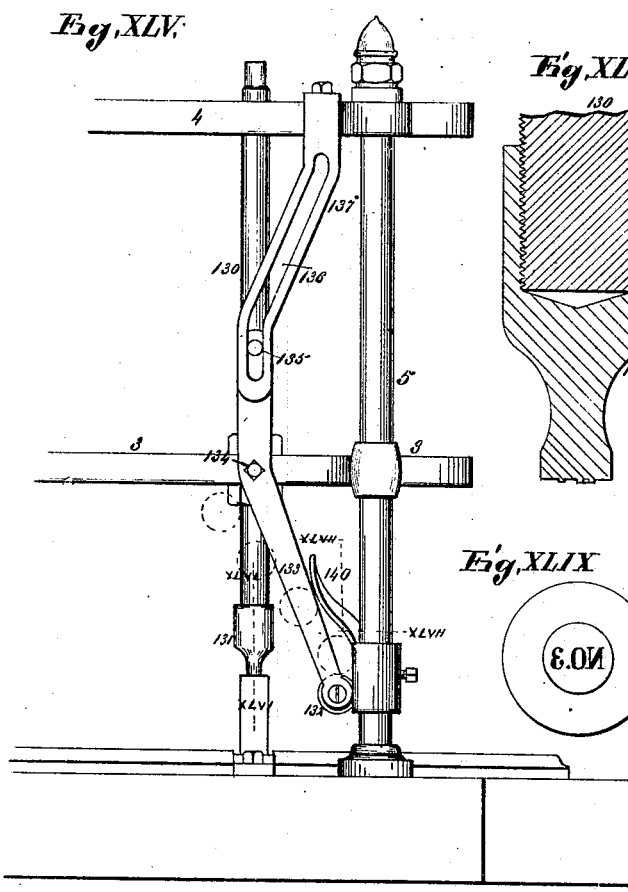
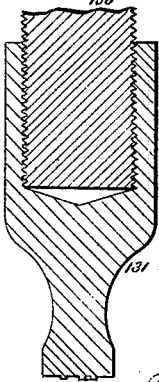
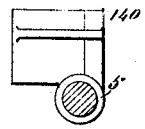
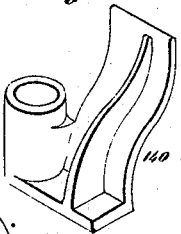
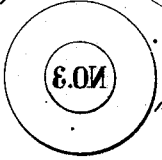
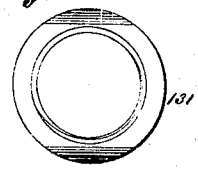
Attest:
Geo. Bruce
J. H. Knight
Inventor:
Alex Euston
By Knight Bro
Attys

UNITED STATES PATENT OFFICE.

ALEXANDER EUSTON, OF ST. LOUIS, MISSOURI.

CARTRIDGE-LOADER.

SPECIFICATION forming part of Letters Patent No. 405,152, dated June 11, 1889.

Application filed July 27, 1888. Serial No. 281,211. (No model.)

*To all whom it may concern:*

Be it known that I, ALEXANDER EUSTON, of the city of St. Louis, in the State of Missouri, have invented a certain new and useful Improvement in Cartridge-Loaders, of which the following is a full, clear, and exact description, reference being had to the accompanying drawings, forming part of this specification, and in which—

Figure I is a side elevation of my improved machine. Fig. II is a top view. Fig. III is an enlarged horizontal section taken on line III III, Fig. I. Fig. IV is an enlarged detail section taken on line IV IV, Fig. II. Fig. V is a similar view taken on line V V, Fig. III. Fig. VI is an enlarged horizontal section taken on line VI VI, Fig. I. Fig. VII is an enlarged horizontal section taken on line VII VII, Fig. XI. Fig. VIII is an edge view of the ratchet for turning the table. Fig. IX is a detail section taken on line IX IX, Fig. VII. Fig. X is a similar view taken on line X X, Fig. VI. Fig. XI is a vertical longitudinal section taken on line XI XI, Fig. VII. Fig. XII is a similar view taken on line XII XII, Fig. VII. Fig. XIII is a detail enlarged section taken on line XIII XIII, Fig. II. Fig. XIV is a detail view of the mechanism for operating the vertically-movable gates that control the passage of the empty shells from their supporting-table. Fig. XV is a detail section taken on line XV XV, Fig. XIII. Fig. XVI is a section taken on line XVI XVI, Fig. XIII, showing the shell-supporting table in top view. Fig. XVII is an enlarged perspective view of the end of the rocking arm that moves the shells or empty cartridges into loading position. Fig. XVIII is a detail section taken on line XVIII XVIII, Fig. III. Fig. XIX is a detail section taken on line XIX XIX, Fig. III. Fig. XX is an enlarged detail view of the bracket that secures the shell-moving lever to the table of the machine. Fig. XXI is a section taken on line XXI XXI, Fig. XX, or on the same line, Fig. III. Fig. XXII is a perspective view of the bracket connecting the lever that moves the shell-pushing arm to the movable disk of the machine. Fig. XXIII is a section taken on line XXIII XXIII, Fig. III. Fig. XXIV is a similar view taken on line XXIV XXIV, Fig. XVIII. Figs. XXV and XXVI are detail vertical sections taken on line XXV XXVI, Fig. II, the two figures showing the parts in different positions. Fig. XXVII is a horizontal section taken on line XXVII XXVII, Fig. XXV. Fig. XXVIII is an enlarged detail vertical section taken on line XXVIII XXVIII, Fig. XXIX. Fig. XXIX is an enlarged detail view of the plunger of the powder or shot charger. Fig. XXX is a top view of the arm that connects the plunger of the powder or shot charger to the movable disk. Fig. XXXI is an enlarged detail vertical section taken on line XXXI XXXI, Fig. II. Fig. XXXII is a similar view taken on line XXXII XXXII, Fig. II. Fig. XXXIII is a top view of one of the vertically-reciprocating shell-protectors to be used while the wads are being applied. Fig. XXXIV is a detail section taken on line XXXIV XXXIV, Fig. XXXI. Fig. XXXV is a detail longitudinal section showing the connection between the sliding dovetail plates found in Figs. XXXI and XXXIV and their operating-levers. Fig. XXXVI is a detail section taken on line XXXVI XXXVI, Fig. VI. Fig. XXXVII is a detail longitudinal section taken on line XXXVII XXXVII, Fig. II. Fig. XXXVIII is a similar view taken on line XXXVIII XXXVIII, Fig. II. Fig. XXXIX is a similar view taken on line XXXIX XXXIX, Fig. XXXVII, and enlarged. Fig. XL is a similar view taken on line XL XL, Fig. XXXVIII. Fig. XLI is a bottom view of one of the dies for giving the shells the first crimp. Fig. XLII is a similar view of the die for giving the shell the second crimp. Fig. XLIII is a view of the shell after it has received the first crimp, and Fig. XLIV is a similar view after the shell has received the second crimp. Fig. XLV is a detail elevation of the printing or marking mechanism. Fig. XLVI is an enlarged detail section taken on line XLVI XLVI, Fig. XLV. Fig. XLVII is a detail transverse section taken on line XLVII XLVII, Fig. XLV. Fig. XLVIII is an enlarged perspective view of the inking-pad. Fig. XLIX is an enlarged bottom view of the printing-die. Fig. L is a top view of the printing-die. Fig. LI is a top view of a loaded shell after it has been printed or marked.

My invention relates to certain improvements in an automatic machine or apparatus for loading cartridges; and my invention consists in features of novelty hereinafter fully described, and pointed out in the claims.

Referring to the drawings, 1 represents supporting-legs, upon which is mounted a shell-supporting table 2. Over the table 2 is a vertically-movable disk or plate 3 and a top plate 4. The plate 4 is supported on the table 2 by connecting-rods 5, (see Fig. XXXII,) these rods being also shown in section in Figs. III and VI, and they act to guide the disk 3. The connection between the rods and the top plate 4 is further illustrated in detail, Fig. IV, the upper ends of the rods having reduced threaded portions to receive the top plate, and upon which are screw-nuts 6, which hold the top plate in place.

In detail, Fig. V, the connection between the sliding disk 3 and the rods 5 is illustrated, the disk being provided with perforated enlargements 7, through which the rods pass, these enlargements giving a broad bearing between the movable disk and the rods to prevent any wabbling or uneven movement.

While the machine is in operation the disk 3 is constantly being raised and lowered, and my preferred means of doing this consists in the use of pitmen or rods 8, connected to the disk at 9 (see Figs. I and III) at their upper ends, and connected at their lower ends to a frame or yoke consisting of parallel bars 10, connected by rods 11. There is a yoke at each side of the machine, and within each yoke fits an eccentric 12 on the driving-shaft 13. I provide one of these rods 8 and its accompanying parts, just mentioned, on each side of the machine, and it will be understood that as the shaft 13 is turned the disk 3 will be raised and lowered by the eccentrics bearing in the frames 10 11. The frames are held in position by guides 14, secured to cross-pieces 15 of the frame 1. The connection between the disk 3 and the rods 8 consists, preferably, of a bar 16, which is bolted to the table at 17, and which fits at its outer ends in holes made in the upper ends of the links 8.

The shaft 13 is provided with a tight and loose pulley 18 to receive the driving-belt, and on it is shown a fly-wheel 18½. The table 2 has a revolving center 19. The dividing-line between the stationary part and the revolving part of the table is indicated by the numeral 20 in Figs. XI and VI. This center is revolved intermittently and not constantly—that is, it moves, stops, and then moves again, each movement and stoppage taking place at the proper time. It is thus intermittently moved by means of a ratchet-wheel 21, rigidly secured to the center by means of a central shaft 22, extending from the ratchet-wheel up to the top of the machine.

The ratchet-wheel is engaged by a spring-pawl 23, (see Figs. VII and XI,) pivoted to a swinging arm 24, which I have shown bifurcated and mounted loosely on the lower end of the shaft 22. This arm 24 is arranged horizontally, and its outer end is engaged by a vertical lever 25, pivoted at 26 to the frame 1 of the machine. Both ends of the lever 25 are bifurcated or forked, the upper end receiving the outer end of the arm 24, (see Figs. XI and XII,) and the lower end embracing a cam 27 on the shaft 13. As the shaft 13 revolves in a direction indicated by the arrow in Fig. XII, it moves the upper end of the lever 25 in the arc of a circle, (indicated by the dotted line A, Fig. XII,) the lever being moved in one direction by the cam 27 bearing against one of the arms on its lower end and moved in the other direction by this cam engaging the other arm on its lower end. When the lever is moved in one direction, it swings the arm 24 on its pivot, and the pawl 23 slips over one notch or tooth of the disk or ratchet-wheel 21. Then as the lever moves in the other direction it turns the ratchet-wheel or disk the distance of one notch or tooth and turns the center 19 a corresponding distance. Thus, as the shaft 13 continues to revolve, the center 19 is turned intermittently through means of the described mechanism.

Upon the center 19 is secured a number of holders 30 for receiving the shells or empty cartridges 31. (See Figs. VI, X, and XIII.) The shape of these holders is shown best in Fig. X, and consists simply of a forked plate slotted at 32 to receive a bolt 33, by which it is adjustably connected to the turning center 19. The fork is in the front end of each plate and is just large enough to receive the shell. It is raised slightly from the turning center 19 to allow the rim 34 (see Fig. XIII) of the shell to slide under the fork, the object being to prevent the shell tipping over (after it is shoved into the holder) during the starting and stopping of the turning center 19.

I will now describe the mechanism for automatically feeding or moving the empty shells into the holders 30 on the turning center 19.

35 represents a funnel secured to a movable bar or support 36. (See Fig. XVIII.) The shells are automatically dropped into this funnel, one at a time, with the cap or flange end foremost. They move down through the funnel and drop upon the table 2, as shown in Fig. XIII. The funnel 35 is sufficiently near the table 2 that when a shell has fallen upon the table its upper end is still within the neck of the funnel. (See Fig. XIII.) Now as soon as the shell falls upon the table the funnel 35 rises from the position shown in full lines in Fig. XIII to the position shown in dotted lines. This causes the funnel to clear the shell. The object of having the upper ends of the shells within the neck of the funnel when they drop into place is to prevent them from tipping over and to hold them upright, and before they can be moved from beneath the funnel the latter has to rise, as stated. As soon as the funnel rises each shell is pushed forward from the position shown in full lines, Fig. XIII, off the stationary part of the table 2 to the position shown by dotted lines in Fig. XIII onto the turning center 19 of the table 2, where it is received by one of the holders 30. This movement of the shell is effected by a crescent or other suitably shaped lever 37, pivoted at 38 to the stationary part of the table 2 by means of a bracket 37½. (See Figs. III, VI, XX, and XXI.) One end of this lever is formed with a circular socket 39, which comes against the shells and forces them from the stationary part of the table onto the turning center and into engagement with the holders, as stated. When a shell falls upon the table, it would occupy about the position shown at 40, Fig. VI, and then the socket 39 of the lever would come against it and move it, as stated. The object of forming the circular socket on the end of the lever is to form such a pocket to receive the shell as will cause it to be moved in the direction indicated by the circular dotted arrow in Fig. VI, or in such a direction that it will properly enter the holder. This end of the lever 37 is provided with a wing 41, which moves beneath the mouth of the funnel, so that when another shell drops into the funnel before the lever returns it is caught by the wing and prevented from falling behind the lever. A perspective view of this part of the lever is shown in Fig. XVII.

The lever 37 is of course arranged in a horizontal position, and it is operated by means of a plate 42, pivoted at 43 to a hanger or bracket 44, secured to the top plate 4. (See Fig. XIX.) The lower end of this lever 42 fits in a slot 45 of the lever 37. (See Figs. III, VI, and XIX.) The plate 42 is provided with a slot 46, which is preferably made straight throughout the greater portion of its length, but at its upper end is curved or bent, as shown at 47, Fig. XIX. In this slot fits a pin 48 on an arm 49, secured to the vertically-moving disk 3. It will thus be seen that as the disk moves from the position shown in full lines, Fig. XIX, to the position shown in dotted lines the plate 42 will be moved from the position shown in full lines to the position shown in dotted lines, and in doing so the lever 37 is moved from the position shown in full lines, Fig. XIII, to the position shown in dotted lines, thus moving the empty shell onto the turning center of the table 2, and as the disk 3 moves down again the lever 37 is moved back to its normal position. On the opposite end of the lever 37 to that I have been describing is a hook 50, which moves the cartridges or loaded shells off the turning center 19, as more particularly described farther on. The funnel 35 is raised (to permit the passage of the shells) by its supporting-bar 36, which passes through a perforation in a plate 51, secured to the vertically-moving disk 3. (See Fig. XVIII.) On the supporting-bar 36 is an adjustable collar 52, (see Figs. XVIII and XXIV,) against which the plate 51 strikes as the disk 3 has about completed its upward movement to lift the funnel from the position shown in full lines, Fig. XVIII, to the position shown in dotted lines. Of course the parts are so disposed that this upward movement of the funnel takes place just at the time the shell or empty cartridge is to be moved, as already described. The lower end of the bar 36 enters a hole or perforation 53 in the table 2, and it is further guided by a bracket 54, secured to the table 2, and through which the bar passes. The bracket is provided with a spring-bolt 55, the function of which is to create a friction against the bar 36 to prevent a lost motion, so that when the bar is lifted by the disk 3 its momentum will not carry it slightly beyond where it would be carried by the disk 3, and when it is allowed to fall again to its normal position the friction of the spring-bolt upon it prevents its upward bounding. The shells are fed into the funnel from an inclined table or holder 56, upon which they are placed by hand or otherwise. They are allowed to enter the funnel one at a time by mechanism constructed as follows:

The shells are all placed with their cap ends toward the side 57 of the holder, (see Fig. XVI,) and as they leave the delivery end of the holder, as shown at 58, Fig. XIII, they are made to drop, cap end first, by an inclined stop or projection 59 and a gate 59½ on the opposite side of the holder to that 57. (See Fig. XVI.) Thus the shells coming against this gate and projection are retarded at their open ends, allowing the cap ends to move first off the holder, as shown by dotted lines in Fig. XIII. The shells are compelled to move, one at a time, off the holder by means of gates or valves 60 61. (See Fig. XIII.) These gates or valves consist simply of small strips of metal guided in a cross-piece 62 and pivoted at their upper ends to the opposite ends of a bar 63, pivoted at 64 to a projection 65 on an arm 66, secured to the top plate 4 of the machine. The bar is moved from the position shown in full lines, Fig. XIII, to the position shown in dotted lines to operate the valves, and it is thus moved by a lever 67, pivoted at 68 to the lower end of the arm 66, and which is connected at its upper end to a projection 69 on the bar 63 by means of a link 70.

On the disk 3 is secured a friction-roller 71. As the disk 3 falls to the position shown in full lines, Fig. XVIII, the roller 71 comes against the lower end of the lever 67 and forces the valves 60 61 into the position shown in full lines, Fig. XIII—that is, the valve 60 is lowered and the valve 61 raised. As this movement takes place the shell that was between the two valves on the holder rolls downward upon the holder, and, coming against the gate 59½ and projection 59, turns, cap end first, and falls into the funnel 35. As the disk rises the roller 71 comes against the upper end of the lever 67 and forces it and the valves 60 61 from the position shown in full lines, Fig. XIII, to the position shown in dotted lines, Fig. XIII. This raises the valve 60 and lowers the valve 61, and the shells roll downward upon the holder, the lower one coming against the valve 61. Then, as the disk 3 falls again, the valve 61 is raised and the valve 60 lowered, the latter coming down between the first and second shells at the lower end of the holder, and the former allowing the shell which is bearing against it to pass to the funnel, as described, and thus the operation goes on continuously.

In Fig. XIV I have shown an edge view of the valves and their operating-bar, and in Fig. XV I have shown a section through the projection 65 and the link 70, which exhibits part of the arm 66 and the lever 67 in edge view. These parts are so disposed, of course, that the shells will be automatically released just at the proper time—that is, a shell would be released from behind the valve 61 just as the end 39 of the lever 37 has made its backward movement, and then while the lever 37 is moving toward the table 2 this valve will shut and the valve 60 open and another shell will roll against the valve 61 and is ready to roll into the funnel as soon as the lever 37 makes its backward movement again. The turning center 19 is provided with a number of the adjustable holders 30, and their distance apart indicates the distance the turning center would move upon each operation of the moving lever 24, so that each time the turning center stops a holder 30 is in front of the end 39 of the lever 37, and as the lever operates each time a holder comes opposite it a shell is forced into each holder. As all the shells go through the same process after they are pushed onto the turning center 19, (one step of this process being accomplished each time the turning center stops,) it will only be necessary to describe the process in connection with the loading of one shell, and this will now be done. Take, for instance, the shell B in Fig. VI. It has been shoved onto the turning center of the table 2 and the center has turned the distance of one notch of the ratchet-wheel 21. This brings the shell beneath a case or canister 80, (see Fig. III,) which contains the powder.

The automatic mechanism for charging the shell with powder is best shown in Figs. XXV to XXX, both inclusive.

The canister 80 is mounted on the upper end of a short pipe or tube 81, which communicates at bottom with a cylinder 82, mounted on a standard 83, secured to the stationary part of the table 2. (See Fig. XXV.) On the vertically-moving disk 3 there is a bracket 84, which is perforated to receive the reduced end 85 of a plunger 86, that passes down through the cylinder 82, and which is made hollow at its lower portion from 87 to 88 to receive a plug 89. Above the plug 89 the plunger has a perforation 90, that when the plunger is raised forms a communication between the cylinder 82 and a chamber within the plunger above the plug 89. The plunger works in a short sleeve or tube 91, secured to the lower end of the cylinder 82, and beneath the lower end of this tube, when the plunger is in its lower position, there is a perforation 92 in the plunger just above the plug 89. Now as the disk 3 rises the bracket 84 comes against the head 93 of the plunger 86 and lifts the plunger until the opening 90 is within the chamber of the cylinder 82. A charge of powder now passes from the cylinder into the hollow plunger, the opening 92 of the plunger at this time being within the sleeve 91, so that the powder cannot pass out of the hollow plunger. Then as the disk 3 completes its downward movement it forces the plunger downwardly again, and the opening 90 is moved out of communication with the chamber of the cylinder 82, and then the opening 92 moves beneath the lower end of the sleeve 91, and the powder runs out of the hollow plunger through the opening or perforation 92, as shown by the small arrows in Fig. XXV, into a funnel 94, secured to and carried by the plunger, and from the funnel the powder passes into the shell B. It will thus be seen that the mouth of the funnel 94 has slightly entered the shell, and this is done to prevent any danger of the entire charge of powder not entering the shell. Before the center 19 starts to move again the disk 3 has raised the point of the funnel out of the shell, and thus the operation goes on, the disk 3 carrying the plunger up to receive a charge of powder and moving it down again to discharge the powder, while in the meantime the turning center 19 has brought another shell into position to receive the powder.

The plug 89 is made adjustable in the plunger, so as to regulate the size of the charge. It has a pin 95 fitting in a slot 96 in the back of the plunger, and the sides of the slot are graduated, as shown in Fig. XXIX, to indicate the size of the charge—that is, the number of drams. My preferred means of making the plug 89 adjustable is by screwing it onto the inner end of a threaded rod 97, which is shown most plainly in Fig. XXVIII, the rod passing through a plug 98 in the lower end of the plunger, and to which the funnel 94 is secured by means of a set-screw 94½. The rod 97 thus moves with the plunger, and it is held from movement in a vertical direction independently of the plunger by means of a small set-screw 99, that enters a circumferential groove 100 in the rod, as shown plainly in Fig. XXVIII. As the plug 89 is screwed onto the rod, (or as the rod is screwed into the plug,) it will be seen that by turning the rod the plug will be raised or lowered within the plunger, thus increasing or decreasing the charge of powder at will.

An enlarged view of the bracket 84 is shown in Fig. XXX, and an enlarged top view of the funnel 94, together with a section of the plunger, is shown in Fig. XXVII.

When the shell B has received its charge of powder, the center 19 moves, and the shell is carried beneath a device for inserting a wad, the wadding device being constructed as shown most clearly in Figs. XXXI, XXXIV, and XXXV. It consists of a stationary tube 101, into which the wads are placed, as shown in Fig. XXXI. Beneath this tube is a table 102, upon which works a slide 103. The slide is secured at 104 to the lower end of a lever 105, pivoted at 106 to a hanger 106½, secured to the top plate 4. The lever has a slot 107, in which fits a pin 108, secured to an arm 109, made fast to the vertically-movable disk 3. The slot 107 is made on an incline out of the vertical, and it will be seen that as the disk 3 rises and falls the lever will be moved from the position shown in full lines, Fig. XXXI, to the position shown in dotted lines. The slide 103 is dovetailed into the table 102, as shown in Fig. XXXIV, and it has ears or projections 110, by which it is secured to the lever 105 by a simple pin 111 passing through them. (See Fig. XXXV.) Each time the slide 103 moves forward it pushes a wad beneath a plunger 112, which has screw-threaded connection with the vertically-movable disk 3, so as to be adjustable, and it moves in a vertical line over the point occupied by the shell that is to receive the wads. The parts are so arranged or disposed that when the slide 103 and the lever 105 move from the position shown in full lines, Fig. XXXI, to the position shown in dotted lines the disk then comes down, bringing the plunger onto the wad which has been shoved over the mouth of the shell, which has been moved there to receive it by the turning of the center 19, and the wad is pressed by the plunger into the shell on top of the powder. The upper end of the plunger 112 preferably passes through a hole made in the stationary top 4, which serves as a guide.

By forming a threaded connection between the plunger and the disk the former is made adjustable up or down, as required, to regulate it. As the wads are being forced into the shells the upper ends of the shells are protected from splitting by guards 600, mounted on the rods 5. (See Figs. VI, XXXII, XXXIII, and XXXVI.) These guards are arranged with their shell-receiving opening 601 (see Fig. XXXIII) directly over the points where the shells stop to receive the wads. As the shells are brought beneath them they are lowered automatically to embrace the upper ends of the shells by cams 602 on the shaft 13, which bear against levers 603, pivoted at 604 to the frame 1. (See Figs. VII and XI.) The levers are connected by rods 605 to the guards 600. (See Figs. VII, XI, XII, XXXII, and XXXVI.) They pass up through the table 2, which serves as a guide. As soon as the wads have been applied the guards rise, allowing the shells to move with the turning center 19. The wads are forced from the table onto the guards and are forced through the guards into the shells.

113 represents a weight on top of the wads in the tube 101, and which may be lifted out of the tube to apply the wads, and for this purpose it is provided with a shank or knob 114, fitting in and projecting from a slot 115 in the sides of the tube 92.

Generally more than one wad is desirable on top of the powder, and all that is necessary to do with my machine is to provide the required number of duplicates of the mechanism I have just described. I have shown three of these devices in Fig. III, and I have described the guards 600 in the plural, as there is one of them for each wadding mechanism. After the wads have all been applied, the next thing is to charge the shell with shot, and for this purpose the shell is brought beneath the shot case or canister 115. (Shown in Figs. III and XXVI.) This shot-canister is provided with a mechanism for automatically discharging the shot into the shells, and this mechanism is exactly like and is operated by the same means as that already described in connection with the powder-charging mechanism. There are no differences between the two mechanisms and their modes of operation. One is shown in Fig. XXV and the other in Fig. XXVI, and it will be unnecessary to repeat the description already given.

For the purpose of identifying the parts I have marked them with the same numerals as applied to the corresponding parts of the powder-charger.

When a shell has been charged with shot, it is next moved beneath a wadding device made or constructed exactly in accordance with the device I have just described, and if more than one wad is desired they are applied in the way I have specified. When the last wad has been applied, the next thing is to crimp the ends of the shells, and this is done by a mechanism shown best in Figs. XXXIX, XL, XLI, and XLII.

The shell is crimped by two operations—the first by means of a plunger 120, under which the shell has been brought by the turning of the center 19. This is provided on its lower end with a die 121, having an interior socket or hole in its lower end of the shape shown in Fig. XXIX. The lower end of the plunger 120 passes down beneath the upper end of the socket of the die and rests (when down) upon the top wad 123 of the shell. As the die comes down upon the end of the shell, it crimps it, as shown in Fig. XLIII. An end view of this die and plunger is shown in Fig. XLI.

The plunger is operated by having a threaded connection with the vertically-moving disk 3, so as to be adjustable up or down, as shown in Fig. XXXVII. It preferably passes through the top plate 4, which serves as a guide. When a shell has been crimped by the first crimper and the plunger 120 rises, the turning center 19 moves the shell under the next plunger, which completes the process of crimping. This second plunger 124 is shown in Fig. XXXVIII. It has screw-threaded connection with the disk 3, so as to be adjustable, (see Fig. XXXVIII,) and it has a die 125 similar to that 121 of the plunger 120. The socket or opening is of a somewhat different shape, being elongated and with straight sides. The end 126 of the plunger in this case is somewhat larger than the end 122 of the plunger 120. When the plunger comes down on the shell, its end 126 forces or folds the crimp down on the wad, while the die 125 embraces and holds the upper end of the shell. This completes the loading of the shell, and the only thing that remains is to print or mark the shell, as shown in Fig. LI, if such marking should be desired.

The mechanism I have employed for doing this is shown in Figs. XLV and XLVI most plainly. It consists of a vertical rod 130, which has threaded connection with the vertically-movable disk 3, so as to be adjustable, and it preferably passes through the top 4, as described. To the lower end of this rod is secured a printing-die 131, upon which is the mark or character to be produced or printed upon the wad. Each time the disk 3 rises the face of the die is inked by means of a roller 132, journaled in the lower end of a lever 133, pivoted to the disk 3 at 134. The upper end of this lever is provided with a pin 135, which fits in a slot 136 in an arm 137, secured to the top 4. The arm 137 is stationary, and as the disk 3 rises it will be seen that the lower end of the lever 132 will be moved to change the inking-roller from the position shown in full lines, Fig. XLV, to the position shown in dotted lines, and as it does so it moves beneath the face of the printing-die and inks it. As it moves back again it comes in contact with an inking-pad 140, secured to one of the tie-rods 5 or some other suitable support. It will thus be seen that as each shell is brought beneath the printing-die it will be printed, and as soon as the die rises the turning center 19 moves again and the shell is carried from beneath the die.

A bottom or face view of the die is shown in Fig. XLIX. A rear view of the inking-pad 140 is shown in Fig. XLVIII. A top view of the inking-die is shown in Fig. L, and a view of the shell marked is shown in Fig. LI.

When the shell leaves the printing-die, it is completed and is automatically removed from the table by mechanism shown best in Figs. VI and XXIII, and which has been heretofore incidentally referred to, it consisting in the end 50 of the lever 37, the parts being so arranged or disposed that this end of the lever is behind the shell when it moves up to this position. As shown in Fig. VI, the lever has made part of its movement in discharging the shell, and as it continues to make its movement the shell is carried outward off the turning center 19 and onto the stationary part of the table 2, where it falls through a hole or opening 145, beneath which is a receiving-tube 146, that carries the shell to any suitable receptacle or place. On the opposite side of the opening 145 to that which the end 50 of the lever 37 approaches is a concave bracket 147, the function of which is to prevent the shell falling out of a vertical line as it is moved over the opening 145, thus compelling the shell to move down vertically through the opening.

This completes the description of the operation of the machine, so far as loading and printing the shells is concerned, and it is only necessary to add that, if desired, a roller 150 may be secured opposite each point where the shells stop, for the purpose of holding or supporting the shells in conjunction with the holders 30 while they are receiving their charges, wads, &c.

As already stated, the outer ends of the holders 30 are raised slightly on the turning center 19. It sometimes happens that shot will fall upon the turning center and get into these holders, preventing the shells from fitting properly. As an automatic means of keeping these clean I secure a little horn-shaped finger 160 to the stationary part of the table 2, and which laps onto the turning center the distance of the socket parts of the holders. At this finger an opening 161 is made in the stationary part of the table 2. Now it will be seen that as the center 19 turns this finger will remove any shot that may have gotten into the holders, the end of the finger entering the space beneath the outer ends of the holders as the holders pass it, or the space which receives the flange of the shell.

I prefer to use a mechanism in connection with the turning center 19 that will automatically engage the turning center at the end of each movement and hold it positively until the pawl and ratchet are again ready to move it. The mechanism I have shown for accomplishing this consists of a lever 300, pivoted at 301 to an arm 302, made fast to the frame of the machine. To the upper end of this lever a pin 303 is secured, the inner end of which works in a hole 304 in the stationary part of the table 2 and enters when forced inward a hole or perforation 305 in the turning center 19 of the table 2. (See Fig. XI.) The pin is held out of the perforation 305, except just at the instant the table completes each movement, when it enters, forming a positive stop. It is moved and held out of engagement with this perforation by a roller 306, secured to one of the yokes 10 11 of the eccentrics 12. As the yoke completes each upward movement it enters or comes opposite a depression 307 in the lever 300, and the pin is then forced into the perforation by a spring 308, surrounding a short rod 309, secured to the lower end of the lever and passing through a guide-bracket 310, made fast to the frame 1. This affords a positive means of stopping the turning center at the end of each movement. As soon as the yoke 10 11 starts to move downward again it moves the pin out of engagement with the hole and the center is free to turn when the proper time comes.

I claim as my invention—

1. In a cartridge-loader, the combination of a table having a fixed portion and a movable portion and mechanism for rotating the movable portion, consisting of a ratchet-wheel 21 secured thereto, a pawl 23, engaging the ratchet-wheel 21, pivoted lever 24, to which the pawl is secured, a vertical pivoted lever 25, having a forked upper end engaging the arm, and a cam 27, engaging the lower end of the lever for moving the same, substantially as and for the purpose set forth.

2. In a cartridge-loader, the combination of a table having a fixed and movable portion, charging devices above the same, adjustable holders secured to the movable portion, a lever operated by suitable mechanism and moving the shells laterally off of the fixed portion onto the movable portion of the table, and guards 150, provided with friction-rollers and mounted on the fixed portion beneath the respective charging devices in proximity to the holders for confining the shell at each stage of the operation, substantially as set forth.

3. In a cartridge-loader having suitable driving mechanism, the combination of a table, a funnel for delivering the cartridge vertically onto the table, a horizontally-swinging arm 39, moving under said funnel and having the tail 41, and a lever connected with the swinging arm and having working connection with the driving mechanism, substantially as and for the purpose set forth.

4. In an automatic cartridge-loader having suitable driving mechanism, the combination, with a table, of mechanism for delivering the shells onto the table, consisting of a tube or funnel normally distant from the table less than the length of a shell and a vertically-reciprocating arm connected to the funnel and actuated by the driving mechanism for lifting the funnel, substantially as and for the purposes set forth.

5. In a cartridge-loader having suitable driving mechanism, the combination of a supporting-table and a wadding device consisting, essentially, of a plunger, means for moving the wads beneath the plunger, a guard for protecting the mouths of the shells, consisting of an adjustable arm having a cylindrical opening slotted to receive the shells, and means for automatically moving the guard, consisting of a rod, a lever connected to the rod, and a cam carried by said driving mechanism and adapted to lift the lever, all substantially as and for the purpose set forth.

6. In a cartridge-loader, the combination of a table and mechanism for delivering the shells onto the table, consisting of a funnel, an inclined holder for receiving a number of the shells, and two reciprocating gates extending into the passage and operated alternately up and down, substantially as and for the purpose set forth.

7. In a cartridge-loader, the combination of the table and mechanism for moving the shells onto the table, consisting of a funnel, a holder, vertically-reciprocating gates projecting into the holder, bar to which the gates are secured, and means for alternately moving the bar to raise and lower the gates automatically, substantially as and for the purpose set forth.

8. In a cartridge-loader, the combination of the table, a funnel located over the table, and means for delivering the shells into the funnel, consisting of a holder 56, vertically-movable gates 60 61, bar 63, to which the gates are secured, link 70, connected to the bar at one end, pivoted lever 67, to which the link is connected at the other end, and a movable disk 3, for operating said lever, substantially as and for the purpose set forth.

9. In a cartridge-loader, the combination of the table, a funnel located over the table, and mechanism for delivering the shells one at a time into the funnel, consisting of a holder having an inclined end 59 and slide 59½, for retarding one end, and the opposite inclined depression 58, for dropping the other, substantially as and for the purpose set forth.

10. In a cartridge-loader, the combination of the table and funnel for delivering the shells onto the table, and an oscillating lever having an end for embracing the shell, and a rearwardly-extending wing 41, for closing the funnel-orifice, substantially as and for the purpose set forth.

11. In a cartridge-loader, the combination of a table, a funnel for delivering the shells onto the table normally distant from the table less than the length of the shell, whereby the shell is not wholly released, and a reciprocating disk 3, to which the funnel is connected for lifting it a short distance after each shell has been deposited, substantially as and for the purpose set forth.

12. In a cartridge-loader, the combination of a table for supporting the shells and a powder or shot charging device, the latter consisting, essentially, of a receiver or canister, a cylinder into which the canister discharges, a hollow movable plunger having perforations to receive and discharge the powder or shot, and a funnel for transferring the powder or shot from the plunger to the shells, said funnel being mounted on a vertically-movable rod, whereby it enters and is withdrawn from the shell, substantially as and for the purpose set forth.

13. In a cartridge-loader, the combination of a table and the powder or shot charging device consisting, essentially, of a cylinder into which the powder or shot is deposited, a hollow vertically-movable plunger having perforations to receive and discharge the powder or shot, connection between the plunger and disk 3 for raising and lowering said plunger, and a funnel for transferring the powder or shot from the plunger to the shell, substantially as and for the purpose set forth.

14. In a cartridge-loader, the combination of a table for supporting the shells and a powder or shot charging device consisting, essentially, of a cylinder into which the powder or shot is deposited, a hollow plunger located within the cylinder and having perforations to receive and discharge the powder or shot, and a funnel for transferring the powder or shot from the plunger into the shell, said plunger being connected to and operated by a movable disk 3, substantially as and for the purpose set forth.

15. In a cartridge-loader, the combination of a table for supporting the shells and a powder or shot mechanism consisting, essentially, of a cylinder, a hollow plunger located within the cylinder and having perforations to receive and discharge the powder or shot, a funnel for transferring the powder or shot from the plunger to the shells, and an adjustable bottom in the plunger, consisting of a plug and a screw-threaded rod entering the plug from the bottom and having a projecting end for turning, for raising and lowering the plug, substantially as and for the purpose set forth.

16. In a cartridge-loader, the combination of a table for receiving the shells and a shot or powder charging mechanism consisting, essentially, of a cylinder, a hollow plunger located within the cylinder and having receiving and discharging openings at different elevations, a tube secured to the cylinder and through which the plunger passes, and a funnel for transferring the powder or shot from the plunger to the shells, said plunger passing through an arm 93 on the disk 3, substantially as set forth.

17. In a cartridge-loader, the combination of a table for receiving the shells and a powder or shot charging mechanism consisting, essentially, of a cylinder, a hollow plunger located within the cylinder and having receiving and discharging openings, a movable bottom in said plunger, a longitudinal rod screwing into said bottom for regulating it, and a pin in said bottom fitting in a graduated slot of the plunger for preventing the bottom from turning and for indicating its location, substantially as and for the purpose set forth.

18. In a cartridge-loader, the combination of a table for supporting the shells and a powder or shot charging mechanism consisting, essentially, of a cylinder, a hollow plunger located within the cylinder and having openings for receiving and discharging the powder or shot, a funnel for transferring the powder or shot from the plunger to the shells, and means for raising and lowering the plunger, consisting of a vibrating disk 3 and arms or brackets 84 mounted thereon, substantially as and for the purpose set forth.

19. In a cartridge-loader, the combination of a table for supporting the shells and a powder or shot charging mechanism having a funnel for transferring the powder or shot to the shells, said funnel being normally distant from the table less than the length of the shell and connected to a vertically-vibrating disk 3, whereby it enters the shells while the powder or shot is being transferred, and then rises out of the shells to permit the latter to be moved away, substantially as and for the purpose set forth.

20. In a cartridge-loader, the combination of a table for holding the shells and a powder or shot charging mechanism consisting, essentially, of a supply-cylinder, a vertically-movable charging-plunger moving in said cylinder, and a funnel secured to and beneath the plunger, so as to be raised and lowered thereby, substantially as and for the purpose set forth.

21. In a cartridge-loader, the combination of the intermittently-moving supporting-table and crimping mechanism consisting of reciprocating rods 120 and 124 and the flared dies 121 and 125 on the respective rods by which the shell is successively treated, the former contracting the shell and the latter having a projection 126 for turning in the edge, substantially as and for the purpose set forth.

22. In a cartridge-loader, the combination of the intermittently-moving supporting-table and a crimping device consisting of the rods 120 and 124, vertically-reciprocating disk 3, with which the rods have screw-threaded connection, and dies on the lower ends of the respective rods by which the shell is successively treated, the die on the former having a projection 122 and being formed to contract the shell around said projection, and the latter having a projection 126 of larger diameter than the former projection, whereby it engages the contracted portion and turns it in, substantially as and for the purpose set forth.

23. In a cartridge-loader, the combination of the supporting-table and a printing device consisting, essentially, of a movable rod, a printing-roller, an adjustable inking-pad, and mechanism for moving the printing-roller automatically against the pad and over the face of the printing-die, substantially as and for the purpose set forth.

24. In a cartridge-loader, the combination of the supporting-table and a printing device consisting of a movable adjustable rod, a pivoted lever, a die secured to the lower end of the rod, a roller secured to the lower end of the lever for inking the face of the die, and mechanism for operating the roller, consisting of a stationary slotted arm having an inclined groove in which fits a pin on said lever, substantially as and for the purpose set forth.

25. In a cartridge-loader, the combination of the supporting-table and a printing mechanism consisting of a movable rod, a printing-die on the end of the rod, and an inking mechanism consisting of a pivoted lever, a slotted stationary arm with which the lever is connected by a pin, a roller secured to the lever, and a pad 140, substantially as and for the purpose set forth.

26. In a cartridge-loader, the combination of a rotating supporting-table and mechanism for moving the shells onto and from the table, consisting of a pivoted lever 37, having ends 39 and 50 moving alternately over said table, substantially as and for the purpose set forth.

27. In a cartridge-loader, the combination of the supporting table 2, a movable disk 3 over the table, and means for moving the shells onto and from the table, consisting of a pivoted lever 37, having shell-engaging ends 39 and 50, a slotted lever 42, pivoted to a fixed part of the machine and engaging the lever 37 with its free end, and an arm 49, carried by the disk 3 and having a pin 48 engaging the slot in lever 42, substantially as and for the purpose set forth.

28. In a cartridge-loader, the combination of a table having a stationary perforated part 2 and a moving center 19, a lever 37, for moving the shells off the moving part, a tube 146, secured to the stationary part beneath the perforation, and a bracket 147 at the perforation and in the path of the lever for stopping the shells in a vertical position and allowing them to pass into the tube, substantially as and for the purpose set forth.

29. In a cartridge-loader, the combination, with a table having a stationary part, a turning center, and suitable loading devices disposed at intervals above said table, of laterally-opening shell-holders 30, secured to the turning center, and adjustable holders 150 opposite to said holders 30 and secured to the stationary part beneath the respective loading devices, substantially as and for the purpose set forth.

30. In a cartridge-loader, the combination of a shell-supporting table having a stationary outer part and a turning center, shell-holders 30, secured to the turning center, clearing-finger 160, secured to the stationary part and extending over the movable part and entering said holders, and a perforation 161 adjacent to the finger, for outlet of the material collected, substantially as and for the purpose set forth.

31. In a cartridge-loader, the combination of a shell-supporting table having a stationary outer part and a turning center, mechanism for moving the center intermittently, and a stop mechanism consisting of a rod fitting in perforations in the two parts of the table, a pivoted lever to which the rod is secured, and means for operating the lever, substantially as and for the purpose set forth.

32. In a cartridge-loader, the combination of a shell-supporting table having a stationary pivoted part and a turning center, mechanism for giving the table an intermittent movement, and mechanism for stopping the table, consisting of a rod 303, fitting in perforations in the table, pivoted lever to which the rod is secured, and which has a depression 307, spring-rod 309, and a movable roller 306, all substantially as and for the purpose set forth.

33. In combination with a suitable table and a reciprocating part above the same in a cartridge-holder, a crimping device consisting of two dies carried by the vibrating part, and to the action of which the shell is successively subjected, the former having a contracted bore with a central core and the latter having a straight bore with a central core, the core of the latter being of greater diameter than the former, whereby the portion of a shell contracted by the former is turned in by the latter, substantially as shown and described.

34. In a cartridge-loader, the combination, with a fixed table and a movable table for substantially the purposes explained, of a brush or sweep secured to the fixed table and projecting over the movable one, substantially as and for the purpose set forth.

35. In a cartridge-loader, the combination, with a fixed table and a movable table, of an arm on the fixed table overhanging the movable table in close proximity thereto, said fixed table having an outlet at or near the arm for allowing the material gathered by said arm to pass off, all substantially as shown and described.

ALEX. EUSTON.

In presence of—
  JOS. WAHLE,
  EDW. S. KNIGHT.